United States Patent
Jones et al.

(10) Patent No.: US 9,122,987 B2
(45) Date of Patent: Sep. 1, 2015

(54) METHOD FOR PREDICTING FUTURE TRAVEL TIME USING GEOSPATIAL INFERENCE

(71) Applicant: Mitsubishi Electric Research Laboratories, Inc., Cambridge, MA (US)

(72) Inventors: Michael Jones, Belmont, MA (US); Daniel Nikovski, Brookline, MA (US); Yanfeng Geng, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 220 days.

(21) Appl. No.: 13/743,996

(22) Filed: Jan. 17, 2013

(65) Prior Publication Data

US 2014/0201121 A1    Jul. 17, 2014

(51) Int. Cl.
| | |
|---|---|
| *G06N 5/02* | (2006.01) |
| *G01C 21/34* | (2006.01) |
| *G08G 1/01* | (2006.01) |
| G08G 1/0968 | (2006.01) |

(52) U.S. Cl.
CPC ............. *G06N 5/02* (2013.01); *G01C 21/3492* (2013.01); *G08G 1/0112* (2013.01); *G08G 1/0133* (2013.01); *G08G 1/0129* (2013.01); *G08G 1/096827* (2013.01); *G08G 1/096844* (2013.01)

(58) Field of Classification Search
None
See application file for complete search history.

(56) References Cited

U.S. PATENT DOCUMENTS

| | | | |
|---|---|---|---|
| 7,375,649 | B2 | 5/2008 | Gueziec |
| 2008/0071465 | A1 | 3/2008 | Chapman et al. |
| 2008/0097686 | A1* | 4/2008 | Takeuchi et al. ............. 701/117 |
| 2010/0063715 | A1 | 3/2010 | Wynter |
| 2011/0161261 | A1 | 6/2011 | Wu et al. |
| 2011/0264708 | A1* | 10/2011 | Smartt ......................... 707/803 |
| 2012/0136561 | A1 | 5/2012 | Barker |
| 2012/0290204 | A1 | 11/2012 | Gueziec |

FOREIGN PATENT DOCUMENTS

WO    0169570 A2    9/2001

OTHER PUBLICATIONS

Wu, Chun-Hsin, Jan-Ming Ho, and Der-Tsai Lee. "Travel-time prediction with support vector regression." Intelligent Transportation Systems, IEEE Transactions on 5.4 (2004): 276-281.*

* cited by examiner

*Primary Examiner* — Kakali Chaki
*Assistant Examiner* — Kevin W Figueroa
(74) *Attorney, Agent, or Firm* — Dirk Brinkman; Gene Vinokur

(57) ABSTRACT

Future travel times of a target vehicle traveling on a route from a starting point to a destination are predicted by first acquiring, by a probe vehicle, real-time probe data to alternative links from the starting point to the destination. Then, the future travel time for each link is predicted using a set of regression functions.

5 Claims, 2 Drawing Sheets

METHOD FOR PREDICTING FUTURE TRAVEL TIME USING GEOSPATIAL INFERENCE

FIELD OF THE INVENTION

This invention relates generally to vehicle traffic conditions, and more particularly to predicting future travel times of vehicles on routes.

BACKGROUND OF THE INVENTION

Various methods are known for predicting future travel times for a target vehicle traveling on a route based on probe data collected by probe vehicles for the same route. The route includes links or sequential road segments. The methods include linear or nonlinear regression, non-parametric regression, neural networks, and support vector machines (SVM). The methods can use locations, current times and date of the target vehicle and compare that data to similar probe data acquired by the probe vehicle. Having a good estimate of the current travel time can significantly improve the prediction of future travel times.

It is important to predict future travel times for each link on the route, instead of simply using the current travel time estimates for each link. This is because a particular route can take hours to travel, and the current travel time can be very inaccurate, e.g., one or two hours later, particularly as traffic conditions change.

On less traveled roads, new probe data from the probe vehicles can be very infrequent and sparse. If there is no recent probe data for a link, then it is difficult to predict the current travel time on the link. For a method that relies on an estimate of the current travel time to make a prediction of future travel times, this is a major problem.

U.S. Pat. No. 7,894,980 describes a method for estimating real-time travel times or traffic loads in a transportation network based on limited real-time data. That method estimates traffic flow, i.e., number of vehicles on a link per unit time, from real time data on one link and using that estimate to predict flow on a connected link based on knowledge of splitting percentages, which is the percentage of vehicles that leave the link instead of continuing along the link.

U.S. Pat. No. 7,375,649 describes a method for identifying a fastest possible travel route. A traveler data processor collects traffic speed data and associates the traffic speed data with road segments. The road segments collectively represent one or more possible travel routes from a start point to an end point. A forecast engine determines a predicted travel time for each of the road segments based on the traffic speed data for each of the road segments. A routing engine determines the fastest possible travel route from the start point to the end point.

U.S. Publication 20120290204 describes a system for predicting a travel time for a traffic route including one or more road segments. A predicted travel time for each of those segments is based on traffic speed data for each road segments. A total travel time is then calculated for the route.

U.S. Publication 20120136561 describes a method predicting traffic conditions at future times by using probabilistic techniques for road segments in real-time based on changing current conditions for a network of roads. One or more predictive Bayesian models and corresponding decision trees are created based on based on historical traffic conditions.

U.S. Publication 20100063715 describes a method for predicting traffic on a transportation network where real time data points are missing. The missing data are estimated using a calibration model of historical data that can be periodically updated, from select links constituting a relationship vector. The missing data can be estimated off-line for part of the network.

Most prior art method use historical data for the prediction. This is a problem because the historical data may not reflect current traffic conditions.

SUMMARY OF THE INVENTION

It is desired to predict future travel times for a target vehicle on a route, e.g., sequence of streets, roads and highways, generally "a set of one or more links," using real-time probe data acquired by probe vehicles traveling on a set of one or more alternative links that substantially parallel the route traveled by the target vehicle.

It is noted that the method uses real-time data, which should be more accurate than the historical data used by conventional methods.

The real-time probe data can be acquired by a cell phone in the probe vehicle, a vehicle navigation system, or other means. The locations and times for the probe vehicles can be sampled frequently, e.g., multiple times each minute.

The embodiments of the invention provide a method for predicting the future travel times when there is no recent estimate of the travel time for any of the links on the route traveled by the target vehicle. This is a fundamental problem when relying on the probe data acquired by the probe vehicles.

Specifically, future travel times of a target vehicle traveling on a route from a starting point to a destination are predicted by first acquiring, by a probe vehicle, real-time probe data for the set of one or more alternate links. A current travel time is estimated for each link. Then, the future travel time for the route is predicted using a set of regression functions.

DETAILED DESCRIPTION OF THE PREFERRED EMBODIMENTS

Prediction Method and Route Optimization

Figure 1:
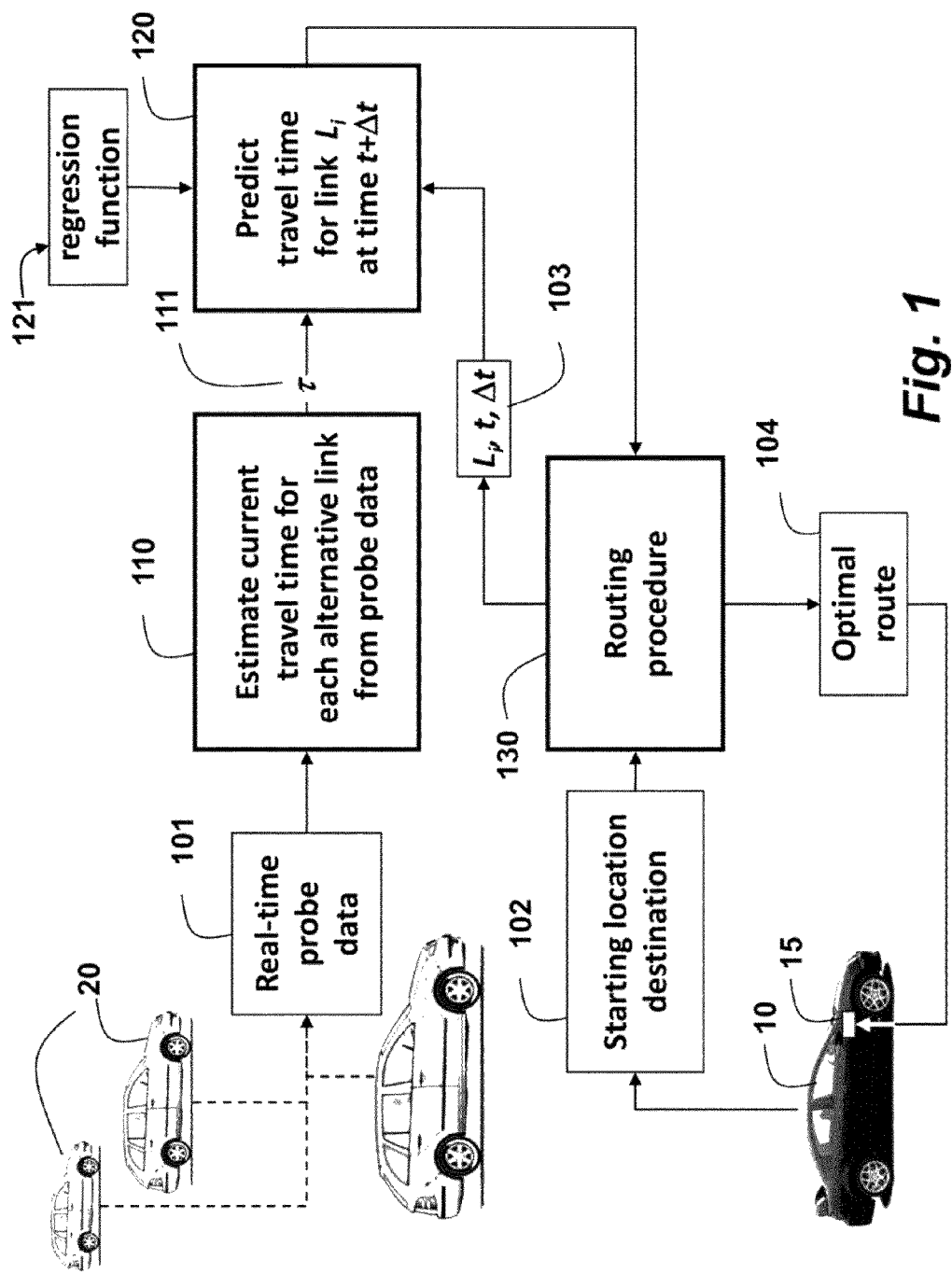
FIG. 1 is a flow diagram of a method for predicting travel times according to embodiments of the invention.

As shown in FIG. 1, the embodiments of our invention provide a method for predicting future travels for a target vehicle 10 traveling on a set of one or more links (L) of a route from a starting point to a destination 102. The starting point and destination can be input by an operator of the target vehicle.

Real-time Probe data 101 are acquired by probe vehicles 20 traveling on a set of one or more alternative links from the starting point to the destination. As defined herein, an alternative link is a nearby road segment that is traveled by the probe vehicles. The probe data includes times (t) for the probe vehicles along the set of one or more alternative links.

A current travel time $\tau_t$ for each alternative link at the current time t is estimated 110 from current or very recent probe data. The current travel time is used to predict 120 a future travel time $\tau_{t+\Delta t}$ for each link L along the route at a time $t+\Delta t$ in the future. The future travel times can then be input to a routing procedure 130 to determine an optimal route 104, which can be output to the operator of the target vehicle.

Optimality can be based on minimum travel time, minimum distance, or combinations thereof.

The steps of the method can be performed in a processor connected to memory and input/output interface as known in the art. The processor 15 can be part of a navigation system arranged in the target vehicle.

Figure 2:
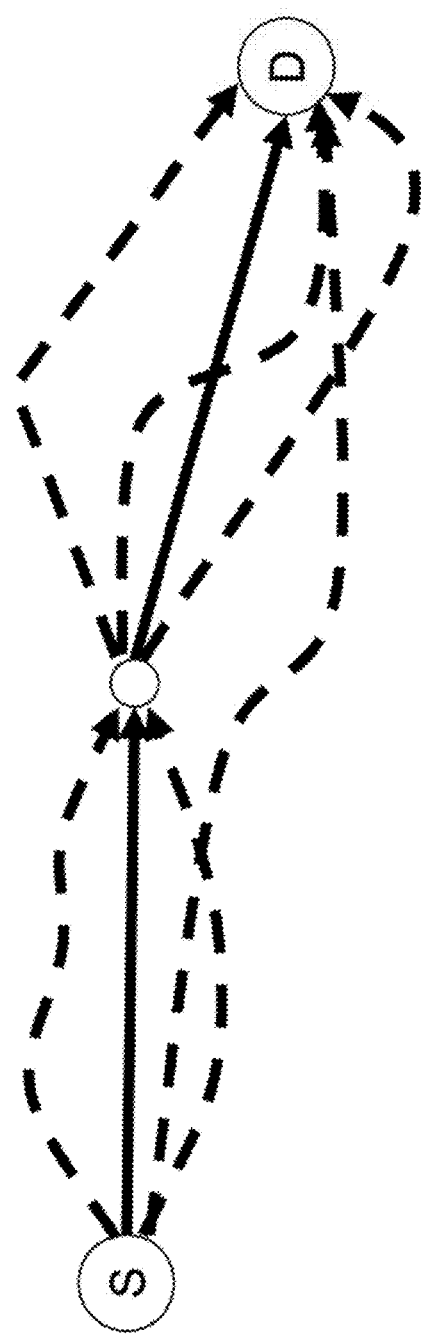
FIG. 2 is a schematic of possible routes and an optimal route according to embodiments of the invention.

FIG. 2 shows the set of one or more links (solid lines) from the starting point (S) to the destination (D), and the set of one or more alternative links (dashed lines).

Geospatial Inference

To solve the prediction problem, we use the idea of geospatial inference. The idea is to predict travel times un a link using estimates of recent travel times for the alternative links.

Our assumption is that when a road is congested, then nearby roads are likely to be congested as well. Therefore, the travel times tar a link used by the target vehicle are predicted using estimates of current travel times for the alternative links, when accurate travel times for the route used by the target vehicle are not available.

Regression Function

To use this idea, we use a regression functions for each alternative link LN. Each regression function predicts future travel times given an estimate of the current travel time for an alternative link along with the current time and the number of minutes ($\Delta t$) in the future for the prediction.

For each alternative link L2, we use the regression function $$f_{L1L2}(t, \tau_{L2}, \Delta t) = \sum_{i=1}^{N} w_i G(t, \tau_{L2}, \Delta t; \theta_i)$$

where t is the current time, $\tau_{L2}$ is the current travel time estimate of the alternative link L2, $\Delta t$ is the future time for the prediction, with respect to the current time $w_i$ is a weight, G is a real-valued functions with corresponding parameters $\theta_i$, e.g., a Gaussian function. The regression function is learned using any number of known techniques.

To use this in practice, a travel time is predicted using each alternative link for which there is recent probe data. The various predictions are averaged, possibly using a weighted average, to obtain the estimated travel time for the link.

Application

A practical system provides optimal routes between an arbitrary starting point and destination using geospatial inference. First, during an off-line training, prior to use the set of regression functions $f_{L1L2}$ is trained for each link $L_i$ and the alternative link $L_j$ using historical probe vehicle data.

Then, during real-time operation, the system in the target vehicle periodically acquires real-time probe data for the alternative links to estimate current travel times for the route.

When the routing procedure is given the starting point and destination, the procedure uses the predicted travel times for the links provided by the set of trained regression functions $f_{L1L2}$. Only regression functions $f_{L1Lj}$, for which a recently updated current travel time on alternative link $L_j$ is available, are used.

Although the invention has been described by way of examples of preferred embodiments, it is to be understood that various other adaptations and modifications can be made within, the spirit and scope of the invention. Therefore, it is the object of the appended claims to cover all such variations and modifications as come within the true spirit and scope of the invention.

We claim:

1. A method for predicting future travel times of a target vehicle traveling on a route from a starting point to a destination, comprising the steps of:
    acquiring real-time probe data by probe vehicles traveling on a set of one or more alternative links, which are substantially parallel to the route traveled by the target vehicle, from the starting point to the destination;
    estimating a current travel time for each alternative link using the real-time probe data; and
    predicting the future travel time of the target vehicle traveling on the route based on the current travel times for the set of one or more alternative links using a set of regression functions, wherein each regression function is $$f_{L1L2}(t, \tau_{L2}, \Delta t) = \sum_{i=1}^{N} w_i G(t, \tau_{L2}, \Delta t; \theta_i)$$

where a L1 is a current link traveled by the target vehicle at a current time t, $\tau_{L2}$ is a current travel time estimate of a particular alternative link L2, $\Delta t$ is a future time for the prediction, with respect to the current time, $w_i$ is a weight, G is a real valued function with corresponding parameters $\theta_i$, wherein the steps are performed in a processor.

2. The method of claim 1, wherein G is a Gaussian function.

3. The method of claim 1, wherein the set of regression functions is learned off-line using historical probe data.

4. The method of claim 1, further comprising:
    outputting the future travel time to an operator of the target vehicle.

5. A system for predicting future travel times of a target vehicle traveling on a route from a starting point to a destination, comprising:
    a probe vehicle configured to acquire real-time probe data for a set of one or more alternative links, which are substantially parallel to the route traveled by the target vehicle, from the starting point to the destination; and
    a processor in the target car configured to predict the future travel time of the target vehicle traveling on the route based on the current travel times for the set of one or more alternative links using a set of regression functions, wherein each regression function is $$f_{L1L2}(t, \tau_{L2}, \Delta t) = \sum_{i=1}^{N} w_i G(t, \tau_{L2}, \Delta t; \theta_i)$$

where a L1 is a current link traveled by the target vehicle at a current time t, $\tau_{L2}$ is a current travel time estimate of a particular alternative link L2, $\Delta t$ is a future time for the prediction, with respect to the current time, $w_i$ is a weight, G is a real valued function with corresponding parameters $\theta_i$.

* * * * *